(12) United States Patent
Guillez et al.

(10) Patent No.: US 7,108,310 B2
(45) Date of Patent: Sep. 19, 2006

(54) CONTROL DEVICE FOR A CONVERTIBLE VEHICLE ROOF WHICH PROVIDES OPTIMUM CLEARANCE ABOVE THE PASSENGER COMPARTMENT

(75) Inventors: Jean-Marc Guillez, Cirieres (FR); Gérard Queveau, Le Pin (FR); Paul Queveau, Montravers (FR)

(73) Assignee: Societe Europeene de Brevets Automobiles, Paris (FR)

( * ) Notice: Subject to any disclaimer, the term of this patent is extended or adjusted under 35 U.S.C. 154(b) by 112 days.

(21) Appl. No.: 10/505,944

(22) PCT Filed: Feb. 20, 2003

(86) PCT No.: PCT/FR03/00568

§ 371 (c)(1),
(2), (4) Date: Aug. 26, 2004

(87) PCT Pub. No.: WO03/072383

PCT Pub. Date: Sep. 4, 2003

(65) Prior Publication Data

US 2005/0121938 A1     Jun. 9, 2005

(30) Foreign Application Priority Data

Feb. 27, 2002   (FR) ................... 02 02482

(51) Int. Cl.
*B60J 7/00* (2006.01)

(52) U.S. Cl. .................. 296/108; 296/107.17

(58) Field of Classification Search ............... 296/108, 296/107.16, 107.17
See application file for complete search history.

(56) References Cited

U.S. PATENT DOCUMENTS

| | | | |
|---|---|---|---|
| 5,979,970 A | 11/1999 | Rothe et al. | 296/107.17 |
| 2001/0006297 A1 | 7/2001 | Dintner et al. | 296/107.17 |
| 2001/0019213 A1 | 9/2001 | Eberle | 296/108 |
| 2001/0040385 A1 | 11/2001 | Obendick | 296/108 |
| 2002/0125733 A1* | 9/2002 | Kinnanen | 296/107.17 |
| 2004/0007897 A1* | 1/2004 | Hasselgruber et al. | 296/108 |

FOREIGN PATENT DOCUMENTS

FR        2 208 745 A1     11/2001

* cited by examiner

*Primary Examiner*—Lori L. Coletta
(74) *Attorney, Agent, or Firm*—Nawrocki, Rooney & Sivertson, P.A.

(57) ABSTRACT

The invention relates to a control device for a convertible vehicle roof comprising several rear (1), intermediary (2) and front (3) rigid roof elements which can be moved between a closed position and a storage position. Said rear (1), intermediary (2) and front (3) elements are connected to each other and to the body in such a way as to pivot around three fulcrum pins (A1, A2, A3). The inventive device comprises co-ordinating means (5, 6, 7, 8) which are used to co-ordinate the pivot movements around said pins (A1, A2, A3). The invention is characterised in that the co-ordinating means (5, 6, 7, 8) are disposed such that the combined movement thereof enables the intermediary element (2) to be inclined at a greater angle when said element is in the highest position thereof.

4 Claims, 4 Drawing Sheets

CONTROL DEVICE FOR A CONVERTIBLE VEHICLE ROOF WHICH PROVIDES OPTIMUM CLEARANCE ABOVE THE PASSENGER COMPARTMENT

The present invention concerns a device for a roof which can be retracted or folded away in the rear boot of a vehicle.

Such a retractable roof makes it possible in particular to transform a vehicle of the two-seater coupé or four-seater coupé or saloon type into a vehicle of the cabriolet type.

Roofs are known which can be retracted in the rear boot of a convertible vehicle comprising at least one front roof element, one intermediate roof element and one rear roof element.

These various elements are connected by means for moving the three elements between a closure position in which they cover the vehicle and a storage position in which they are stored in the rear boot.

In this retractable rigid roof system, the rear element is mounted so as to pivot on a transverse pivot axis on the vehicle bodywork.

The intermediate element is mounted so as to pivot between its rear end and the front end of the rear element.

The front element is mounted so as to pivot between its rear end and the front end of the intermediate element.

In the storage position, the front element is situated between the intermediate element and the rear element, the whole forming a substantially horizontal assembly in the rear boot.

The curves of the front and intermediate elements are then in opposite directions whilst the curve on the front element is in the same direction as the curve on the rear element, their concavity being turned upwards.

In a vehicle having such a roof, where the front element pivots with respect to the intermediate element, a problem is posed of movement of this element with respect to the movement of the rest of the retractable roof assembly.

In addition, under the roof elements in movement, there must exist sufficient vertical clearance in order not to strike the head of one of the occupants of the vehicle.

The aim of the present invention is to afford improvements to the known means, in order to control and guide the movement of the roof elements in an optimum manner between the closure position and the storage position in the boot.

To this end, the invention relates to a control device for a retractable vehicle roof, comprising several rigid rear, intermediate and front roof elements able to be moved between a position in which they are stored inside the rear boot of the vehicle, superimposed substantially horizontally, the front element being placed between the rear element and the intermediate element, and a position in which they cover the vehicle cabin, the rear of the rear element being connected pivotally to the bodywork at a first transverse pivot axis, the rear of the intermediate element being connected pivotally to the front of the rear element on a second transverse pivot axis, the rear of the front element being connected pivotally to the front of the intermediate element on a third transverse pivot axis.

The device comprises drive means and coordination means for coordinating the pivot movements about the said axes.

According to the invention, the coordination means are arranged so that the combined movement of the coordination means allows a greater inclination of the intermediate element when the latter is in its highest position.

Thus the pivoting movement of the front element on the third axis is non-linear with respect to the pivoting movement of the rear element on the first axis.

On retraction, the device therefore makes it possible to raise the intermediate element so that the front edge of the front element does not encroach on the volume of the cabin.

According to a particular embodiment of the invention, the device comprises two arms articulated on the bodywork, a first link articulated on the two arms close to one of its ends and at an intermediate point on the intermediate element, and a second link articulated at one of its ends on the other end of the first link and at its other end on the front element.

According to another embodiment of the invention, the second link is articulated at one of its ends on the first link and at its other end on a lever able to pivot about a pivot axis so that the front element can pivot about the axis in order to be stored against the internal face of the intermediate element.

The two arms can be angled in the direction of the rear element. One of the two arms can be longer than the other.

The angled arms allow easy storage of the elements inside the boot.

Other particularities and advantages of the invention will also emerge from the following description, a description given with reference to the accompanying figures, in which.

Figure 1:
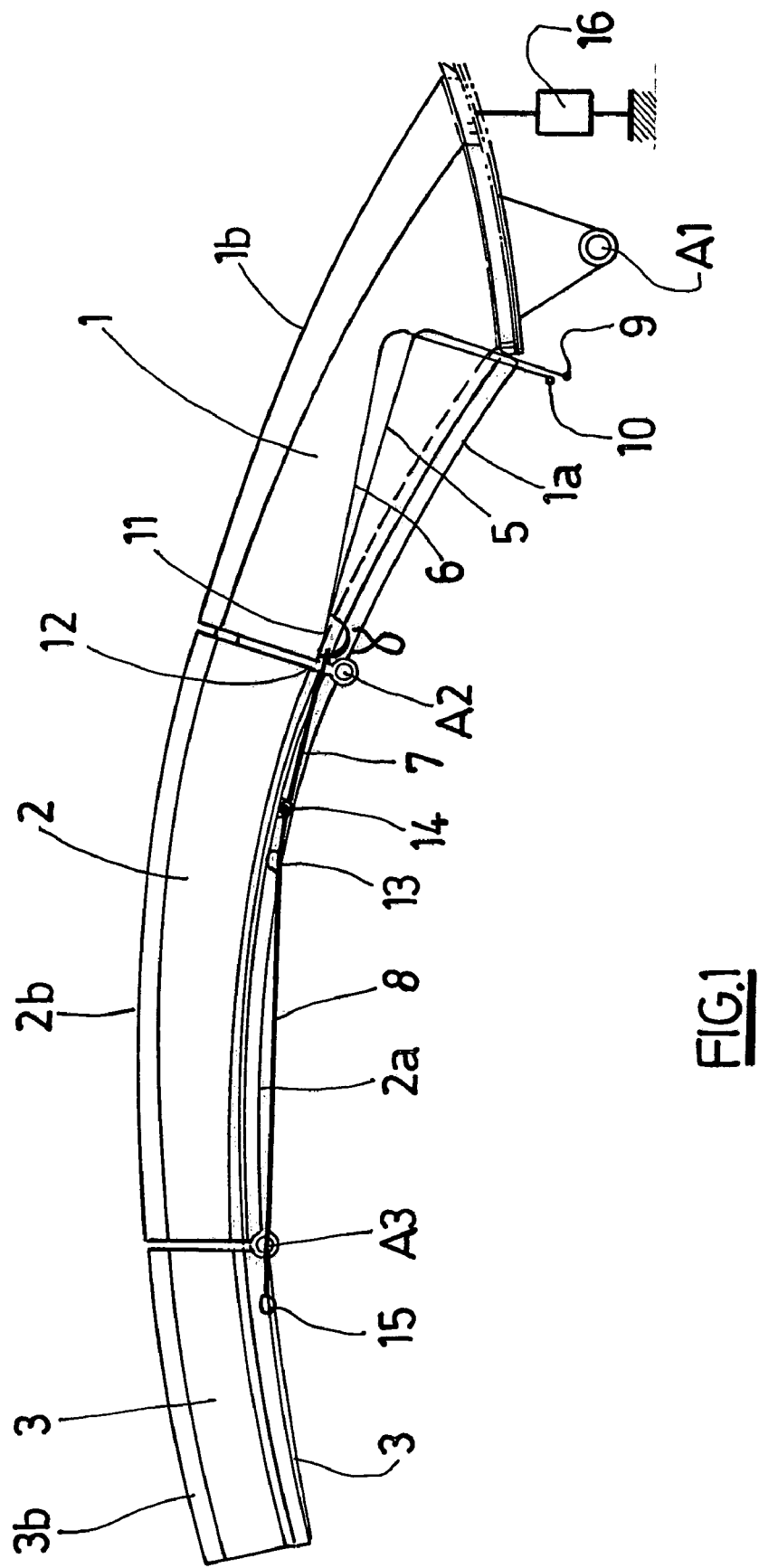
FIG. 1 is a view in schematic longitudinal section of a vehicle roof according to the invention in the closed position.
Figure 3:
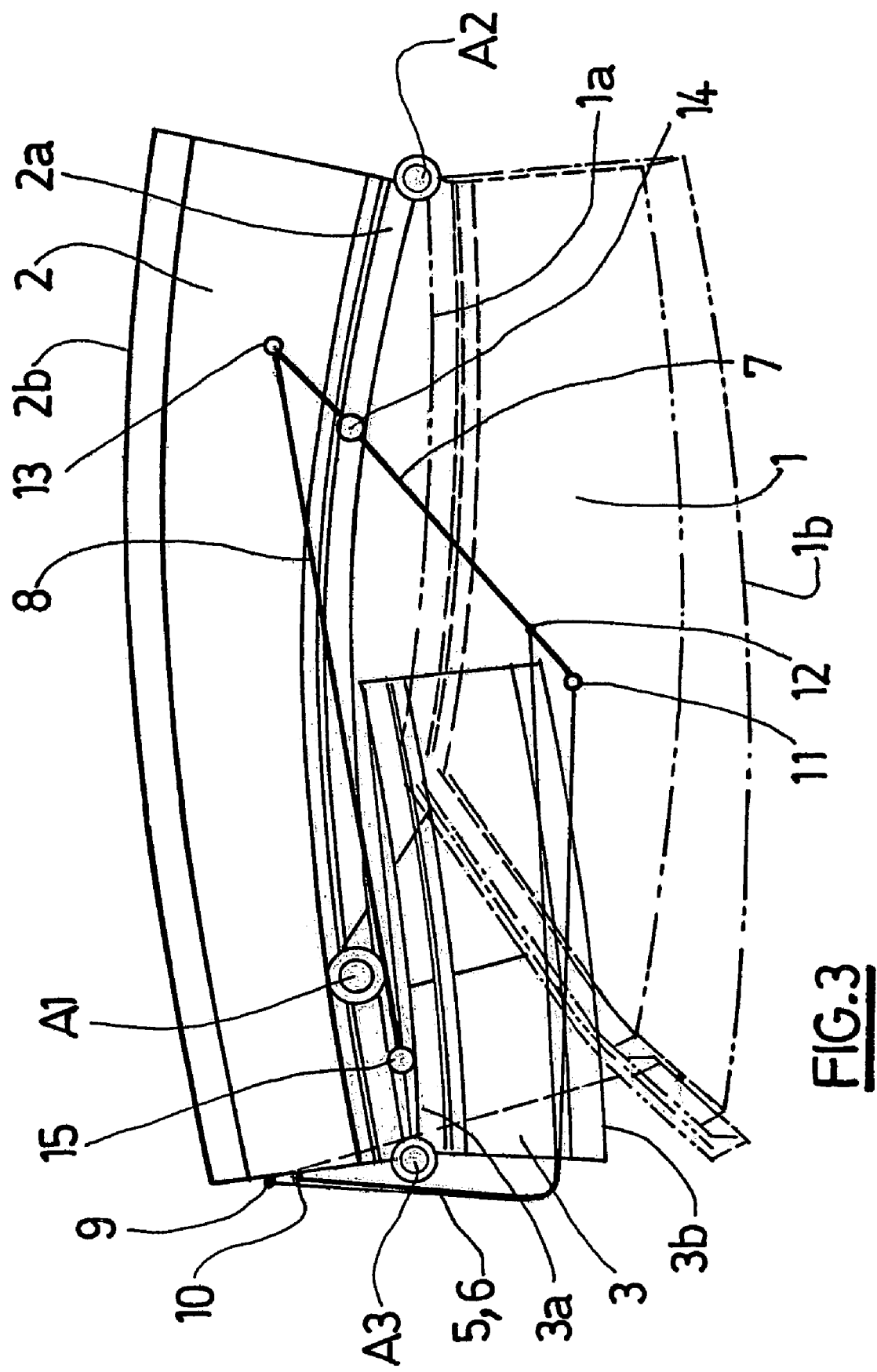
FIG. 3 is a view in schematic longitudinal section of the roof according to the invention in the storage position in the rear boot.

The retractable roof depicted in FIG. 1 comprises three rigid roof elements 1, 2, 3 which can be moved between a position in which they cover the vehicle cabin (FIG. 1) and a position in which they are stored inside the rear boot of the vehicle (FIG. 3).

In the embodiment depicted of a roof with three elements, the rear of the rear element 1 rests against the rear boot of the vehicle and the front of the front element 3 rests against the top end of a windscreen.

Each roof element 1, 2, 3 has an internal face 1a, 2a, 3a situated towards the cabin and an external face 1b, 2b, 3b situated towards the outside of the vehicle.

The rear of the rear element 1 is connected pivotally to the vehicle bodywork on a pivot axis A1 transverse to the longitudinal direction of the vehicle.

The rear of the intermediate element 2 is connected pivotally to the front of the rear element 1 on a pivot axis A2 transverse to the longitudinal direction of the vehicle.

The pivot axis A2 is situated substantially level with the internal faces 1a, 2a of the rear 1 and intermediate 2 elements.

Finally, the rear of the front element 3 is connected pivotally to the front of the intermediate element 2 on a pivot axis A3 transverse to the longitudinal direction of the vehicle. The axis A3 is situated substantially level with the internal faces 2a, 3a of the intermediate 2 and front 3 elements.

With reference to FIG. 3, in the storage position, through the position of the pivot axis A3, the intermediate 2 and front 3 elements are superimposed against one another along their internal faces 2a, 3a. The curves of these two elements are then in opposite directions.

The front element 3 is, in this storage position, interposed between the rear 1 and intermediate 2 elements, the curves of the rear 1 and front 3 elements being in the same direction.

Figure 2:
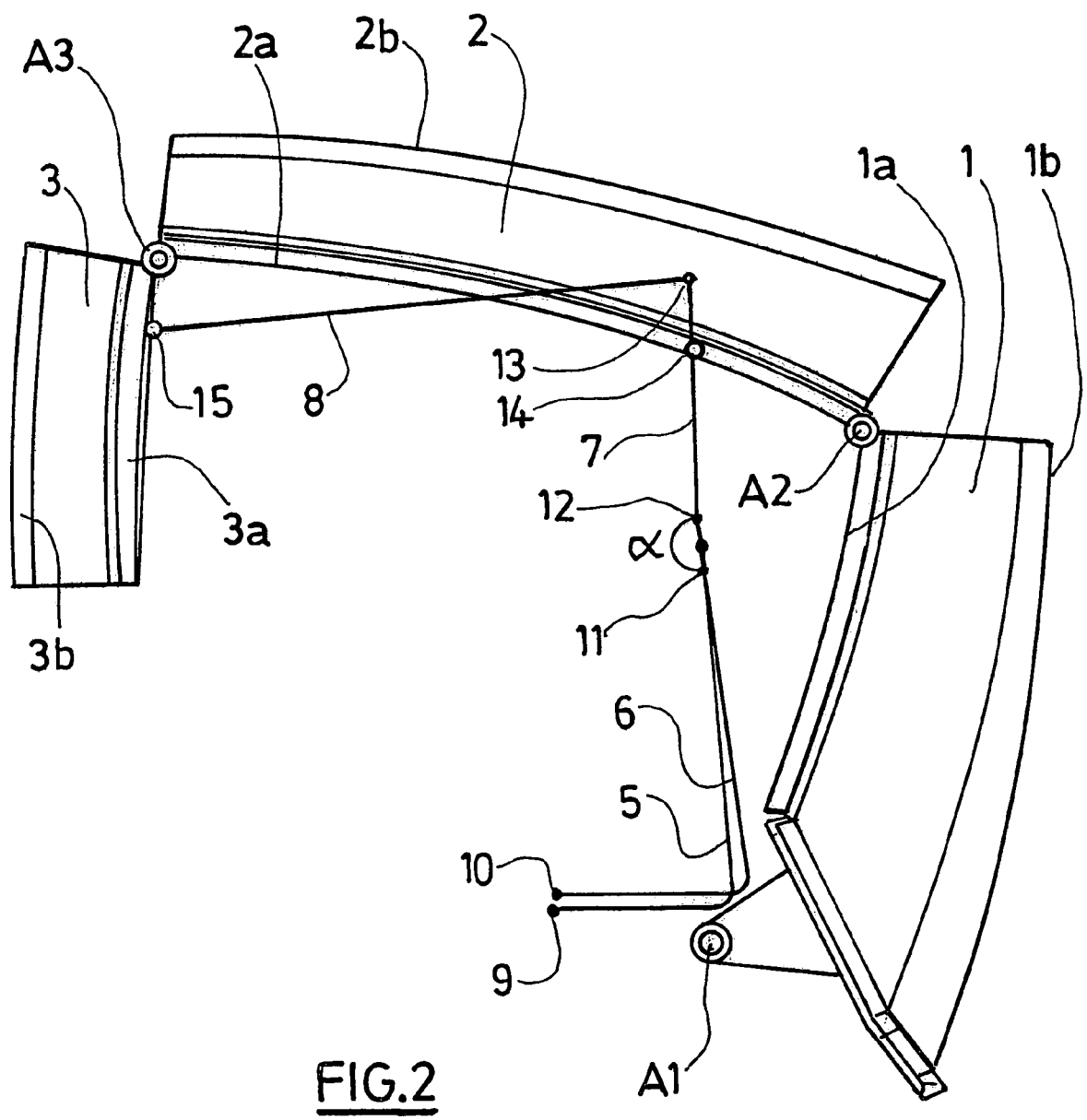
FIG. 2 is a view in schematic longitudinal section of the roof according to the invention in the course of retraction.

With reference to FIGS. 1, 2, 3, the roof retraction mechanism comprises, on each side of the vehicle:
- a pair of angled arms 5, 6;
- a first link 7;
- a second link 8;
- points of articulation 9, 10, 11, 12, 13, 14, 15 between the previous elements 5, 6, 7, 8.

Each arm in the pair of angled arms 5, 6 is articulated on the bodywork at an articulation point 9, 10 and on the first link 7 at an articulation point 11, 12.

The articulation point 11 is situated at the end of the link 7.

The articulation point 12 is situated at a point close to the end of the link 7, the distance between the articulation points 11, 12 and between the points 9, 10 determining the geometry of the quadrilateral 9, 10, 11, 12 and therefore the inherent kinematics of the link 7.

The first link 7 is articulated at its end opposite to the articulation points 11, 12 on the second link 8 at an articulation point 13.

This first link 7 is also articulated on the intermediate roof element 2 at an articulation point 14 forming a pivot.

The distance between the articulation points 13 and 14 determines the inherent kinematics of the front element 3.

The articulation point 14 is situated substantially on the internal face 2a of the intermediate element 2.

At its end opposite to the first link 7, the second link 8 is articulated on the rear of the front element 3 at an articulation point 15.

In the closed position, the arms 5, 6 and links 7, 8 do not substantially encroach on the vehicle cabin.

A person skilled in the art will know how to choose the relative lengths and positionings of the various elements of the device so that these are adapted to the roof and make it possible to achieve the retraction, the principle of which is explained below.

The retraction of the roof elements 1, 2, 3 in the rear boot of the vehicle is described, the passage from the storage position to the closed position taking place in a reverse movement of the roof elements.

The movement of the rear element 1 towards the vehicle boot is controlled by any suitable means 16 such as an electric or hydraulic motor enabling the rear element 1 to pivot about its pivot axis A1.

The movement of the rear element 1 gives rise to a general movement of the whole of the roof and particularly the pivoting of this about the pivot axis A2.

The movement of the intermediate element 2 is also guided by the assembly formed by the two arms 5, 6 and the first link 7 articulated at the articulation point 13.

Likewise the movement of the intermediate element 2 gives rise to a movement of the front element 3 and the pivoting thereof about the pivot axis A3.

The movement of the front element 3 is also guided by the second link 8.

Thus the three elements, rear 1, intermediate 2 and front 3, have a simultaneous and coordinated movement.

Figure 4:
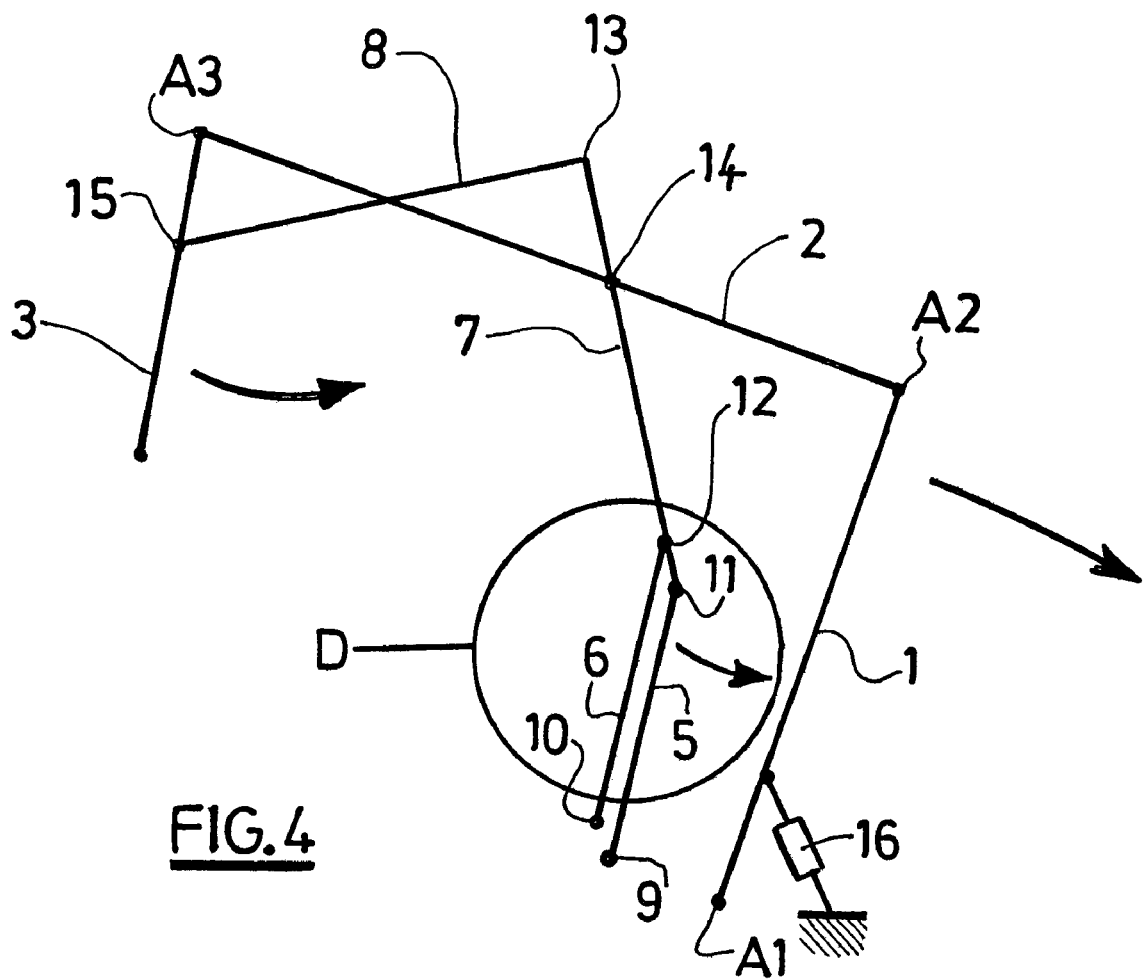
FIG. 4 is an outline diagram of the movement.

With reference to FIGS. 2 and 4, when the rear element 1 and front element 3 are substantially vertical.

Around this position, the intermediate element 2 is at its highest with respect to the car cabin and offers a maximum vertical clearance for the tilting of the front element 3.

The arm 6 is placed with respect to the arm 5 so that the articulation point 12 moves more towards the rear than the articulation point 11.

Thus, when the rear element 1 tilts towards the rear, the part of the link 7 lying between the articulation points 11, 14 tilts forwards.

The movement of the link 7 gives rise to a traction of the second link 8, itself causing a folding of the front element 3 towards the intermediate element 2.

The angle α formed by the link 7 and the two pairs of arms 5, 6 is substantially 180°, the maximum value reached during retraction.

The higher the value of the angle α, the more the intermediate element 2 can be raised with respect to the cabin, thus offering a maximum vertical clearance for allowing pivoting of the front element 3 not interfering with the vehicle passengers.

The combined movement of the link 7 with respect to the arms 5 and 6 and the movement of the assembly composed of the arms 5, 6 and the link 7 with respect to the movement of the rear 1 and intermediate 2 elements cause a progressive pivoting of the front element 3 by means of the link 8.

Subsequently the movement of the various elements 1, 2, 3 continues until these are substantially superimposed horizontally in the vehicle boot, as shown in FIG. 3.

Between the closed position and the storage position, the arms 5, 6 have made a rotation of approximately 180°.

Figure 5:
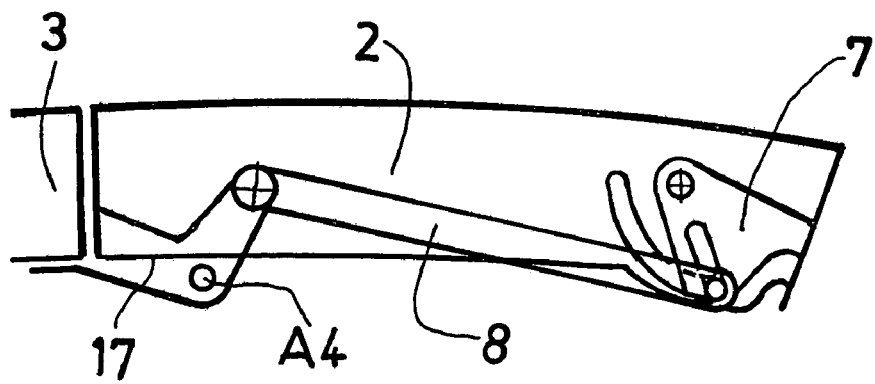
FIG. 5 is a view in longitudinal section of another embodiment of the articulation of the intermediate 2 and front 3 elements.

With reference to FIG. 5, in a second embodiment, the tilting of the front element 3 under the intermediate element 2 is effected by the link 8 articulated at an articulation point 17 on an L-shaped lever 18.

The lever 18 is able to pivot on a pivot axis A4 situated to the front of and below the internal face 2a of the intermediate element 2.

All the retraction means described above are placed so that, when the roof is retracted, the link 8 pushes the part of the lever on which it is articulated.

The lever 18 pivots about its axis A4 and the front element is placed under the intermediate element.

The invention claimed is:

1. A control device for a retractable vehicle roof, comprising several rigid rear (1), intermediate (2) and front (3) roof elements able to be moved between a position in which they are stored inside the rear boot of the vehicle, superimposed substantially horizontally, the front element (3) being placed between the rear element (1) and the intermediate element (2), and a position in which they cover the vehicle cabin, the rear of the rear element (1) being connected pivotally to the bodywork at a first transverse pivot axis (A1), the rear of the intermediate element (2) being connected pivotally to the front of the rear element (3) on a second transverse pivot axis (A2), the rear of the front element (3) being connected pivotally to the front of the intermediate element (2) on a third transverse pivot axis (A3), said device comprising drive means (16) and coordination means (5, 6, 7, 8) for coordinating the pivoting movements about said axes (A1, A2, A3), characterised in that said coordination means (5, 6, 7, 8) are arranged so that the combined movement of the coordination means (5, 6, 7) allows a greater inclination of the intermediate element 2 when the latter is in its highest position, the coordination means comprising two arms articulated on the bodywork at two articulation points, a first link articulated on the two arms close to one of its ends at two articulation points and at an intermediate point on the intermediate element.

2. A control device for a retractable vehicle roof, comprising several rigid rear (1), intermediate (2) and front (3) roof elements able to be moved between a position in which they are stored inside the rear boot of the vehicle, superimposed substantially horizontally, the front element (3) being placed between the rear element (1) and the intermediate element (2), and a position in which they cover the vehicle cabin, the rear of the rear element (1) being connected pivotally to the bodywork at a first transverse pivot axis (A1), the rear of the intermediate element (2) being connected pivotally to the front of the rear element (3) on a second transverse pivot axis (A2), the rear of the front element (3) being connected pivotally to the front of the intermediate element (2) on a third transverse pivot axis (A3) , said device comprising drive means (16) and coordination means (5, 6, 7, 8) for coordinating the pivoting movements about said axes (A1, A2, A3), characterised in that said coordination means (5, 6. 7, 8) are arranged so that the combined movement of the coordination means (5, 6, 7) allows a greater inclination of the intermediate element 2 when the latter is in its highest position, being further characterised in that it comprises two arms (5, 6) articulated on the bodywork at two articulation points (9, 10), a first link (7) articulated on the two arms (5, 6) close to one of its ends at two articulation points (11, 12) and at an intermediate point (14) on the intermediate element (2), and a second link (8) articulated at one of its ends on the other end of the first link (7) and at its other end on the front element (3).

3. A control device for a retractable vehicle roof, comprising several rigid rear (1), intermediate (2) and front (3) roof elements able to be moved between a position in which they are stored inside the rear boot of the vehicle, superimposed substantially horizontally, the front element (3) being placed between the rear element (1) and the intermediate element (2), and a position in which they cover the vehicle cabin, the rear of the rear element (1) being connected pivotally to the bodywork at a first transverse pivot axis (A1), the rear of the intermediate element (2) being connected pivotally to the front of the rear element (3) on a second transverse pivot axis (A2), the rear of the front element (3) being connected pivotally to the front of the intermediate element (2) on a third transverse pivot axis (A3), said device comprising drive means (16) and coordination means (5, 6, 7, 8) for coordinating the pivoting movements about said axes (A1, A2, A3), characterised in that said coordination means (5, 6, 7, 8) are arranged so that the combined movement of the coordination means (5, 6, 7) allows a greater inclination of the intermediate element 2 when the latter is in its highest position, being further characterised in that it comprises two arms (5, 6) articulated on the bodywork at two articulation points (9, 10), a first link (7) articulated on the two arms (5, 6) close to one of its ends at two articulation points (11, 12) and at an intermediate point (14) on the intermediate element (2), and a second link (8) articulated at one of its ends on the other end of the first link (7) and at its other end on a lever (18) able to pivot about a pivot axis (A4) so that the front element (3) can pivot about the axis A4 in order to be stored against the internal face of the intermediate element 2.

4. A device according to claim 2, characterised in that the two arms (5, 6) are angled in the direction of the rear element.

* * * * *